United States Patent [19]
Swain

[11] Patent Number: 6,167,183
[45] Date of Patent: Dec. 26, 2000

[54] LOW PROFILE COMMUNICATIONS OUTLET BOX

[75] Inventor: Wilfred James Swain, Clinton, Conn.

[73] Assignee: Hubbell Incorporated, Orange, Conn.

[21] Appl. No.: 08/865,804

[22] Filed: May 30, 1997

[51] Int. Cl.[7] .................................................. G02B 6/00
[52] U.S. Cl. ........................ 385/135; 385/134; 385/137
[58] Field of Search .................................... 385/134, 135, 385/136, 137

[56] References Cited

U.S. PATENT DOCUMENTS

| | | | |
|---|---|---|---|
| 4,840,449 | 6/1989 | Ghandeharizadeh | 350/96.2 |
| 4,850,901 | 7/1989 | Smith et al. | 439/676 |
| 4,874,904 | 10/1989 | DeSanti | 174/53 |
| 4,976,510 | 12/1990 | Davila et al. | 350/96.2 |
| 5,033,978 | 7/1991 | Thornhill et al. | 439/540 |
| 5,412,751 | 5/1995 | Siemon et al. | 385/135 |
| 5,442,725 | 8/1995 | Peng | 385/135 |
| 5,506,927 | 4/1996 | Kitajima et al. | 385/135 |
| 5,511,144 | 4/1996 | Hawkins et al. | 385/135 |
| 5,613,030 | 3/1997 | Hoffer et al. | 385/135 |
| 5,617,501 | 4/1997 | Miller et al. | 385/134 |

*Primary Examiner*—Phan T. H. Palmer
*Attorney, Agent, or Firm*—Alfred N. Goodman; Mark S. Bicks; Tara L. Hoffman

[57] ABSTRACT

A low profile communications outlet box is disclosed which can accommodate fiber optic cables in a compact housing without bending the fiber optic cables past their minimum bend radius. The outlet box has a base and a cover for forming a wiring space therebetween. A pair of winding rings or members are located between the base and cover to prevent the fiber optic cables from being bent beyond their minimum bend radius. The winding rings or members overlap each other to decrease the size of the outlet box. Moreover, the winding rings or members are offset from each other such that the upper winding member lies in a different plane from the lower winding member.

24 Claims, 17 Drawing Sheets

LOW PROFILE COMMUNICATIONS OUTLET BOX

FIELD OF THE INVENTION

The present invention generally relates to communications outlet boxes or connector housings for accommodating fiber optic cables. More specifically, the present invention relates to a telecommunications outlet box which accommodates both fiber optic cables and copper-based cables.

BACKGROUND OF THE INVENTION

In the past, telecommunication cables were primarily copper-based cables, which are quite durable and do not require a lot of special care. However, more recently, optical fibers are being used in the telecommunications field for transmitting data and/or other signals. Optical fibers transmit data via light signals from one point to another. In particular, optical fibers carry more signals over higher band widths in the same amount of space than traditional electrical wires, e.g., copper wires. In other words, optical fibers are capable of transmitting more information than copper wires of the same size. One drawback of optical fibers, as compared to copper wires, is that optical fibers are generally small in diameter and brittle. Also, if optical fibers are bent beyond their prescribed minimum bend radius, the signal quality may be compromised. Accordingly, it is important that optical fibers are not bent beyond a prescribed minimum bend radius. Consequently, optical fibers require special care during installation.

Optical fibers are typically bundled together and covered with a sheath to form a fiber optic cable. In general, the cable manufacturer cuts the fibers and attaches an optical fiber connector to one end of each of the fibers so that all of the fibers in a single cable are of the same length. The other end of the optical fibers must be spliced to connectors at the other end. Typically, such interconnections are contained in enclosures or outlet boxes designed to provide a reservoir of slack fiber to accommodate splicing changes.

The enclosures or outlet boxes for optical fibers must not bend the optical fibers beyond their minimum bend radius. In the past, the excess optical fibers were allowed to hang loose within the enclosure. However, optical fibers have a natural stiffness and elasticity which causes them to resist bending and return to a straight position. Because of this, an optical fiber extends straight out from the component to which it is mounted. If the fiber is bent too much, the signal quality may be compromised as mentioned above. Further, the reliability of the fiber may also be compromised. Consequently, optical fibers cannot be bent in the same manner than normal copper-based electrical wires. Accordingly, it is important that the enclosure or outlet box is designed to maintain the required optical fiber transmission characteristics and the integrity of the plurality of fibers within the enclosure or outlet box.

Typically, both fiber optic telecommunications cables and copper-based telecommunications cables run either along or through walls, ceilings and floors of a building and terminate in outlet boxes or junction boxes. The ends of the telecommunications cables are then fitted with connectors for receiving a mating connector of a telecommunications device or other types of devices.

Since many installations currently have conventional copper-based telecommunication wires, it is important that a new enclosure or outlet box be capable of handling both fiber optic cables as well as the conventional copper-based cables.

Examples of enclosures and/or other devices for housing fiber optic cables are disclosed in U.S. Pat. No. : 4,840,449 to Ghandeharizadeh; U.S. Pat. No. 4,850,901 to Smith et al.; U.S. Pat. No. 4,874,904 to DeSanti; U.S. Pat. No. 4,976,510 to Davila et al.; U.S. Pat. No. 5,033,978 to Thornhill et al.; U.S. Pat. No. 5,412,751 to Siemon et al.; U.S. Pat. No. 5,442,725 to Peng; U.S. Pat. No. 5,506,927 to Kitajima et al.; U.S. Pat. No. 5,511,144 to Hawkins et al.; U.S. Pat. No. 5,613,030 to Hoffer et al.; and U.S. Pat. No. 5,617,501 to Miller et al.

In view of the above, there clearly exists a need for an enclosure or outlet box which is capable of handling fiber optic cables in a reliable and compact enclosure or outlet box. This invention addresses this need in the art as well as other needs in the art which will become apparent to those skilled in the art from this disclosure.

SUMMARY OF THE INVENTION

One object of the present invention is to provide a communications outlet box for accommodating fiber optic cables in a compact and reliable manner.

Another object of the present invention is to provide a communications outlet box which can accommodate both fiber optic cable and conventional electrical wires.

Yet another object of the present invention is to provide a communications outlet box which is relatively inexpensive to manufacture.

Still another object of the present invention is to provide a communications outlet box which can be utilized with either single gang or double gang electrical boxes.

The foregoing objects are basically attained by a communications outlet box for a fiber optic cable comprising a base having a mounting member with a first side for engaging a mounting surface, and a second side facing in a substantially opposite direction to said first side; a cover configured to be removably coupled to the base for forming a wiring space therebetween, with a first opening formed in the outlet box for receiving the fiber optic cable therethrough and into said wiring space between the base and the cover and a second opening formed in the outlet box for receiving a connector therein; a first winding member positioned relative to the first opening and between the base and the cover to receive the fiber optic cable about at least part of its curved periphery such that the fiber optic cable can extend from the opening to the first winding member without bending beyond its minimum bend radius; and a second winding member positioned relative to the first winding member and between the base and the cover to receive the fiber optic cable about at least part of its curved periphery such that the fiber optic cable can extend from the first winding member to the second winding member without bending beyond its minimum bend radius, the second winding member being at least partially positioned in a different plane such that the fiber optic cable exiting the second winding member can pass over the first winding member to be coupled to a connector in the second opening.

The foregoing objects can also be obtained by a communications outlet box for a fiber optic cable comprising a base having a mounting member with a first side for engaging a mounting surface, and a second side facing in a substantially opposite direction to said first side; a cover configured to be removably coupled to the base for forming a wiring space therebetween, with a first opening formed in the outlet box for receiving the fiber optic cable therethrough and into said wiring space between the base and the cover and a second opening formed in the outlet box for receiving a connector therein; a first winding member positioned relative to the first opening and between the base and the cover to receive the fiber optic cable about at least part of its curved periphery such that the fiber optic cable can extend from the opening to the first winding member without bending beyond its minimum bend radius; and a second winding member positioned relative to the first winding member and between the base and the cover to receive the fiber optic cable about at least part of its curved periphery such that the fiber optic cable can extend from the first winding member to the second winding member without bending beyond its minimum bend radius, the curved peripheries of the winding members having radii of at least about 1.2 inches with centers of the winding members being spaced less than about 2.4 inches apart.

Other objects, advantages and salient features of the present invention will become apparent to those skilled in the art from the following detailed description, which, taken in conjunction with the annexed drawings discloses two preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
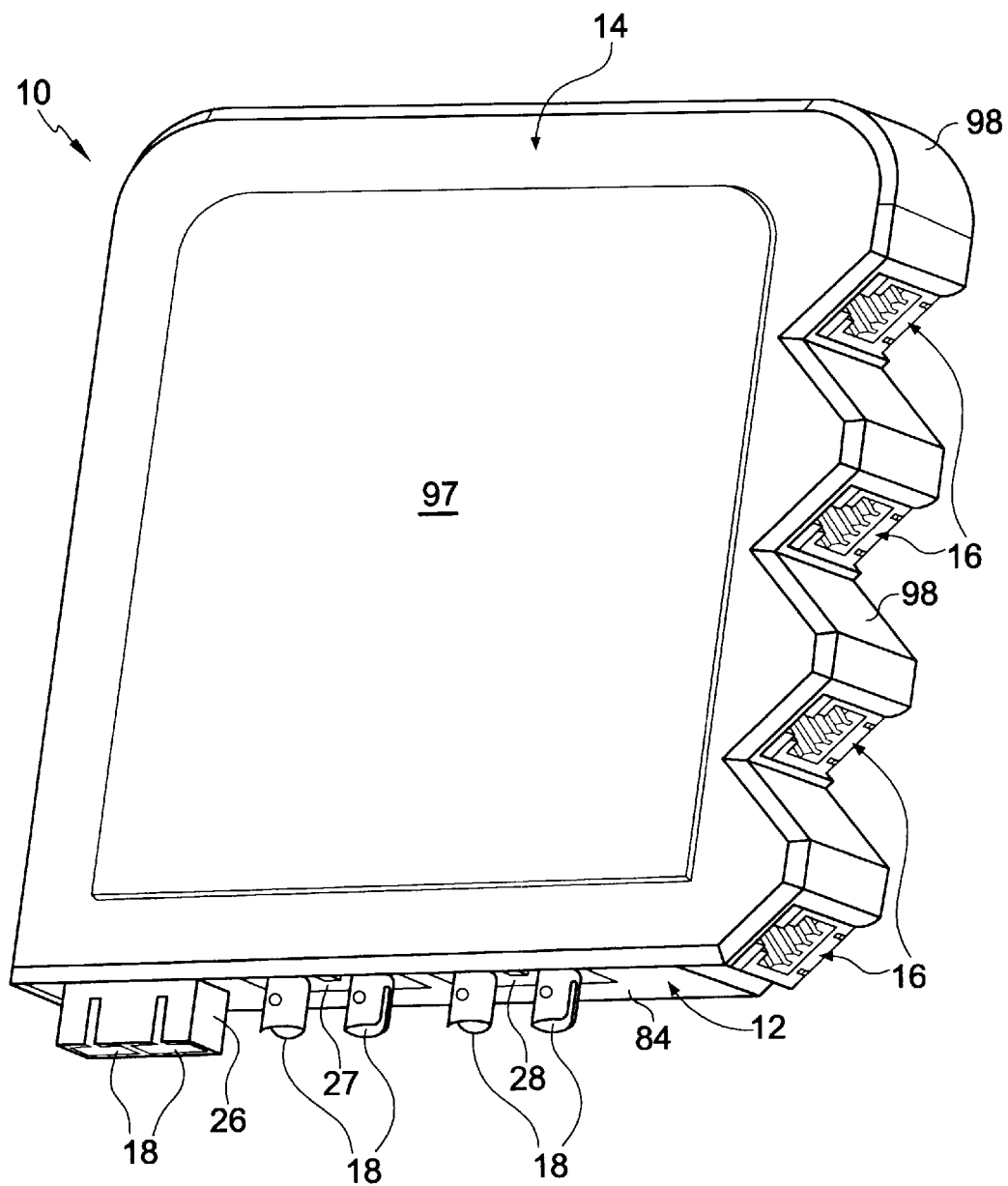
FIG. 1 is a front perspective view of a low profile communications outlet box or plate for accommodating both fiber optic cables and copper cables in accordance with a first embodiment of the present invention.
Figure 2:
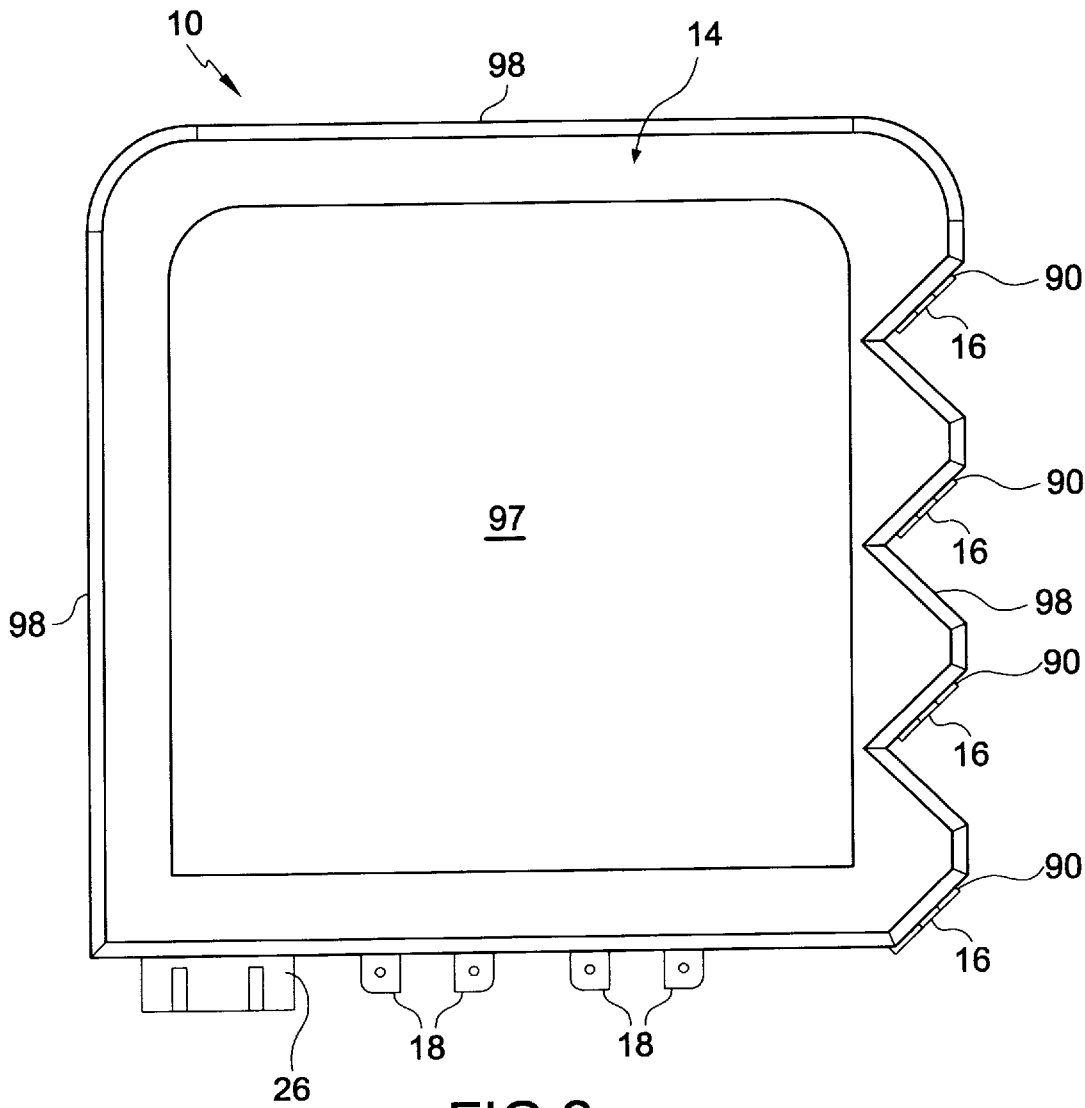
FIG. 2 is a front elevational view of the low profile communications outlet box illustrated in FIG. 1.
Figure 3:
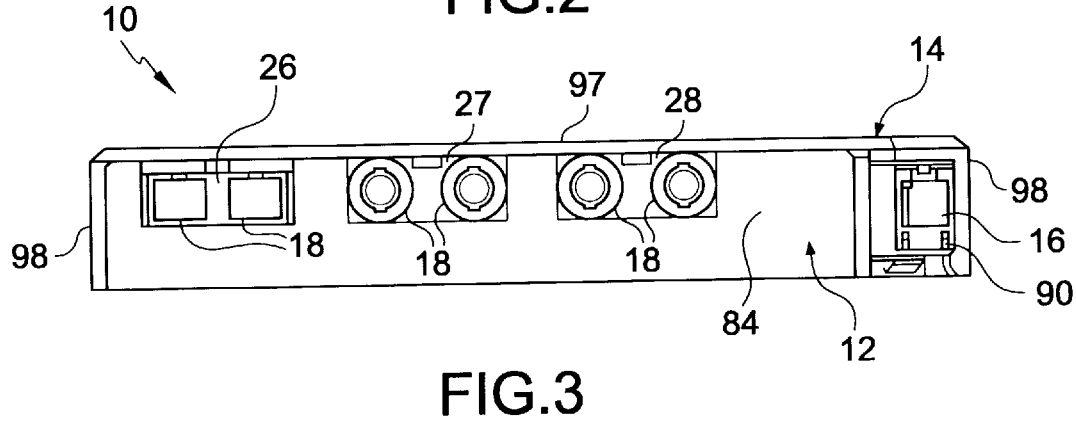
FIG. 3 is a bottom plan view of the low profile communications outlet box illustrated in FIGS. 1 and 2.

Referring initially to FIGS. 1–4, a low profile communications outlet box or plate 10 is illustrated for connecting therein fiber optic cables and copper cables to their respective connectors in accordance with a first embodiment of the present invention. Low profile communications outlet box 10 basically includes a base 12 adapted to be coupled to an electrical box (not shown) mounted within a wall, and a cover 14 adapted to be removably coupled to base 12. Base 12 and cover 14 define an interior wiring space therebetween for receiving cables, preferably communication cables. In particular, communications outlet box 10 is designed to accommodate the connection of connectors 16 and 18 to copper cables or wires 20 and fiber optic strands or cables 22, respectively, in a compact and low cost structure. Preferably, outlet box 10 is only one inch in depth such that furniture can be placed very close to the wall. It will be understood by those skilled in the art that the term "cable(s)" is being used broadly herein to refer to one wire or strand as well as more than one wire or strand.

As seen in FIGS. 1–4, communications outlet box 10 is designed to accommodate four copper-based high density jacks or connectors 16 as well as three fiber optic connectors 18. Connectors 18 can be three duplex SC style connectors, or three ST style connector pairs, or any combination of styles. As seen in the drawings, two of connectors 18 are ST style fiber optic connector pairs and one of the connectors 18 is an SC style connector. Jacks 16 and connectors 18 are well-known in the art. Therefore, jacks 16 and connectors 18 will not be discussed and/or illustrated in detail herein. Moreover, it will be apparent to those skilled in the art from this disclosure that other types of connectors could be utilized with the communications outlet box in accordance with the present invention. Also, the communications outlet box 10 in accordance with the present invention can be modified to include a greater number or fewer jacks and/or connectors as needed and/or desired. Copper cables or wires 20 are coupled to jacks 16 in a conventional manner, while fiber optic cables or strands 22 are coupled to connectors 18 in a conventional manner. Preferably, jacks 16 are coupled to base 12 via a snap-fit, while connectors 18 are coupled to base 12 via retainers 26, 27 and 28.

Referring now to FIGS. 4–12, base 12 is illustrated in various views to show various details thereof Preferably, base 12 is a one-piece, unitary member constructed of a suitable material. For example, base 12 can be constructed of a flame retardent thermoplastic. Preferably, base 12 is molded utilizing a straight-draw mold such that the base has no hidden surfaces as viewed in front elevation or rear elevation. Of course, other types of molding techniques can be utilized to form base 12.

Base 12 has a contoured rear mounting member 30 with an outer peripheral wall structure 32 extending substantially perpendicular therefrom to form an enclosure, and an interior wall 34 for separating jacks 16 from connectors 18. Rear mounting member 30 has a first or exterior side 36 for engaging a mounting surface such as a wall, a second or interior side 38 for directing and accommodating copper cables 20 and fiber optic cables 22. A cable access opening 40 is formed in rear mounting member 30 such that cables 20 and 22 can enter communications outlet box 10 from the electrical box (not shown).

Alternatively, the telecommunications cables 20 and 22 can enter through the side of outlet box 10 instead of through the rear of outlet box 10 as shown. In particular, the side walls of outlet box 10 could be provided with breakout windows for accommodating cables running in wall mounted conduits. Accordingly, outlet box 10 can be modified to be used with cables running in wall mounted conduits by providing an opening in the outer peripheral wall of base 12. Of course, in other embodiments, such an opening can be located in the side wall of cover 14.

Rear mounting member 30 has six mounting holes 42 formed therein for receiving fasteners or screws (not shown) to attach base 12 to the electrical box (not shown). More specifically, these six mounting holes 42 are arranged and spaced apart from each other such that two of the mounting holes 42 can be utilized to mount base 12 to a single gang electrical box. The remaining four mounting holes 42 are arranged to couple base 12 to a double gang electrical box in a conventional manner via fasteners. In either case, cable access opening 40 will be arranged such that it will align with the opening of the electrical box to which base 12 is to be mounted.

Of course, it will be apparent to those skilled in the art from this disclosure that base 12 can be mounted to other types of mounting surfaces utilizing other types of fasteners. For example, base 12 could be adhesively secured to a wall such that opening 40 overlies an opening in the wall such that cables 20 and 22 are received through cable access opening 40 into the interior of communications outlet box 10. Moreover, mounting holes 42 could be arranged such that base 12 can be attached directly to the wall utilizing conventional fasteners and anchors rather than to an electrical box.

To accommodate fiber optic cables or strands 22, base 12 is provided with a pair of fiber optic cable winding rings or supports 44 and 46. Preferably, winding rings or supports 44 and 46 are integrally formed with base 12 as a one-piece, unitary member. However, it will be apparent to those skilled in the art that winding rings 44 and 46 could be separate elements which are coupled to base 12. Moreover, while in the preferred embodiments, winding rings 44 and 46 are formed as a part of base 12, it will be apparent to those skilled in the art that winding rings 44 and 46 could be coupled to cover 14 if needed and/or desired.

Winding rings or supports 44 and 46 are designed to protect fiber optic cables 22 from excessive bending which can cause the fiber optic cables to be damaged. In particular, the minimum bend radius for fiber optic cables should be approximately 1.2 inches. Accordingly, the radii of winding rings 44 and 46 are at least 1.2 inches. Moreover, winding rings 44 and 46 are arranged relative to cable access opening 40 and connectors 18 such that fiber optic cables 22 are provided with a very natural path through the interior of communications outlet box 12 to feed fiber optic connectors 18. More specifically, cable access opening 40 is arranged such that fiber optic cables 22 enter through cable access opening 40 and then extend substantially tangentially to the outer peripheral surface of the lower winding ring 44. The fiber optic cables 22 can then wrap several times (for example, eight times) around lower winding ring 44 and then exit tangentially out of lower winding ring 44. Fiber optic cables 22 are then directed tangentially to the outer periphery of upper winding ring 46 where the fiber optic cables 22 partially wrap therearound.

Figure 4:
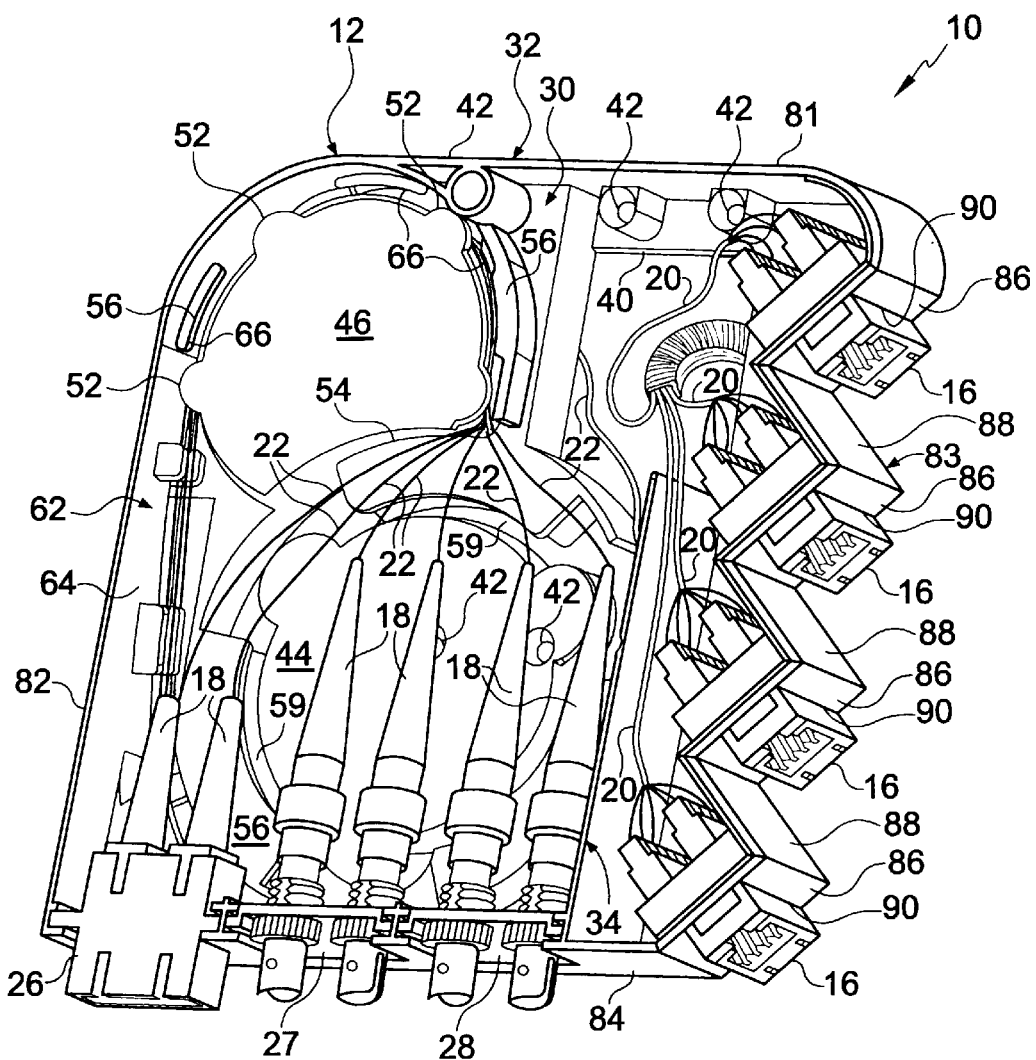
FIG. 4 is a front perspective view of the low profile communications outlet box illustrated in FIGS. 1–3 with its cover removed to illustrate the fiber optic cables and the copper cables extending therethrough and connected to their associated connectors.

Upper wire ring 46 is spaced from the ends of fiber optic connectors 18 such that a very natural feed of the fiber optic cables 22 occurs between upper winding ring 46 and connectors 18. In other words, upper winding ring 46 is spaced from the inner ends of connectors 18 such that the fiber optic cables 22 do not have to bend past their minimum bend radius. This can be accomplished by having upper winding ring 46 lying in a plane spaced from the plane of lower winding ring 44 such that the fiber optic cables 22 exiting upper winding ring 46 pass over lower winding ring 44 to connectors 18 as best seen in FIG. 4.

To maintain fiber optic cables 22 on winding rings 44 and 46, a plurality of tabs 50 and 52 extend outwardly from the peripheral surfaces of winding rings 44 and 46, respectively. In other words, tabs 50 and 52 extend outwardly from winding rings 44 and 46, respectively, and are spaced from the interior side 38 of rear mounting member 30 such that the fiber optic cables 22 are received in the space between rear mounting member 30 and tabs 50 and 52.

In addition to tabs 50 and 52, rear mounting member 30 is provided with guide walls 54 with a plurality of flanges 56 extending therefrom. Flanges 56 are spaced from the interior side 38 of mounting member 30 such that the fiber optic cables 22 can be received between the interior side 38 of rear mounting member 30 and flanges 56. Preferably, flanges 56 follow the path of fiber optic cables 22 as it passes through communications outlet box 10. Guidewalls 54 form a continuous channel 58 for fiber optic cables 22.

The guide channel 58 has a circular section 59 surrounding the exterior of lower winding ring 44, a connecting section 62 extending from circular section 59 to a curved section 66 partially surrounding the exterior of upper winding ring 46. The channel 58 is also provided with an entrance 60 extending between cable access opening 40 and circular section 59 of channel 58. The exit 68 of channel 58 is provided at the end of curved section 66 for feeding fiber optic cables 22 to connectors 18.

More specifically, channel 58 formed by guidewalls 54 has a circular section 59 surrounding lower winding ring 44 with an entrance 60 extending between cable access opening 40 and circular section 59 of channel 58. Accordingly, after the fiber optic cables 22 enter communications outlet box 10 via cable access opening 40, the fiber optic cables 22 enter circular section 59 of the channel 58 via entrance 60. Once the fiber optic cables 22 enter circular section 59 of channel 58, the fiber optic cables wrap around the periphery of lower winding ring 44. The fiber optic cables 22 are retained on winding ring 44 via tabs 50 and flanges 56.

Figure 5:
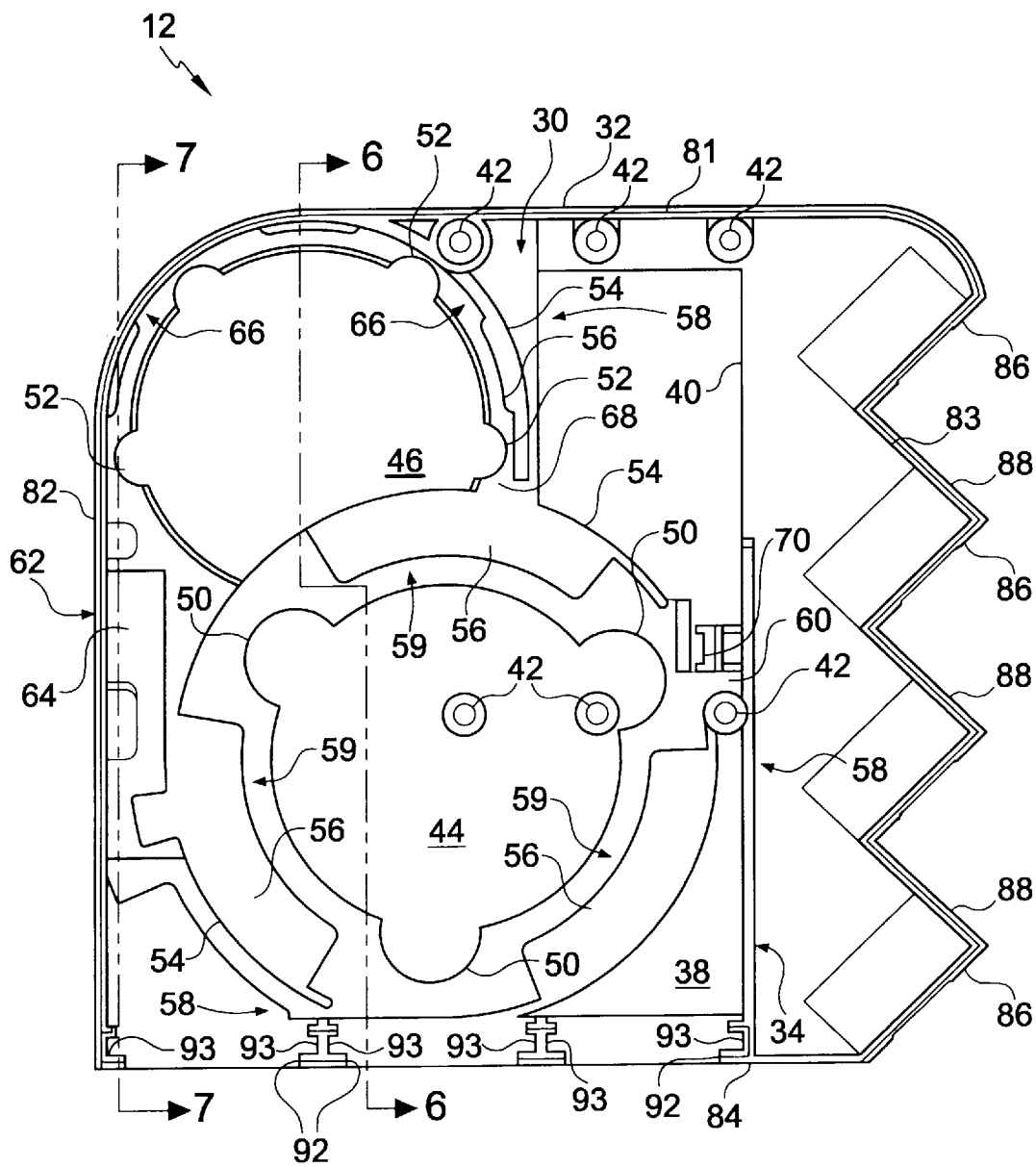
FIG. 5 is a front elevational view of the base of the low profile communications outlet box illustrated in FIGS. 1–3, with the electrical connectors and wiring removed therefrom for purposes of illustration.
Figure 6:
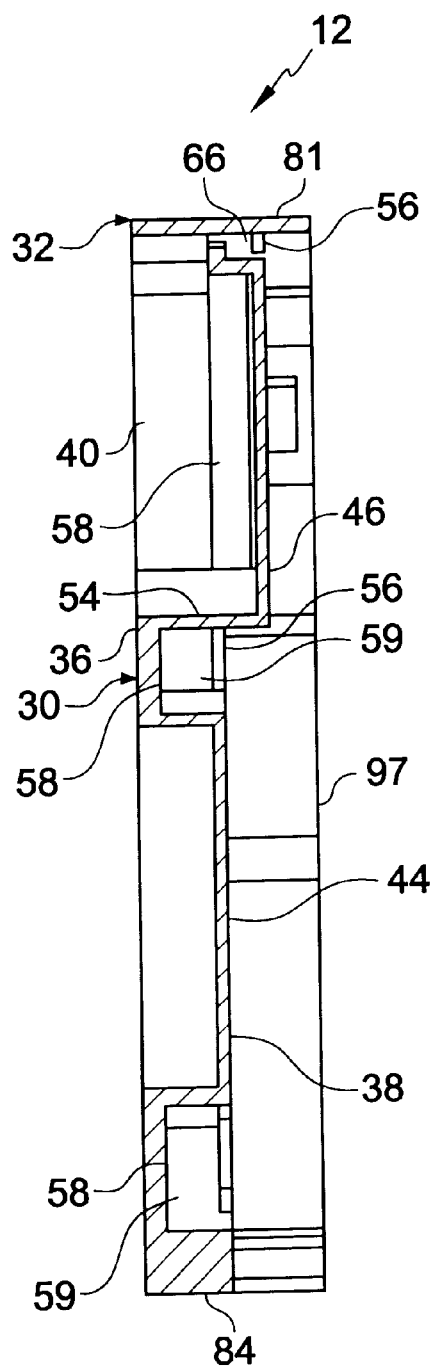
FIG. 6 is a vertical cross-sectional view of the base illustrated in FIG. 5 for the low profile communications outlet box illustrated in FIGS. 1–3 as seen along section line 6—6 of FIG. 5.
Figure 7:
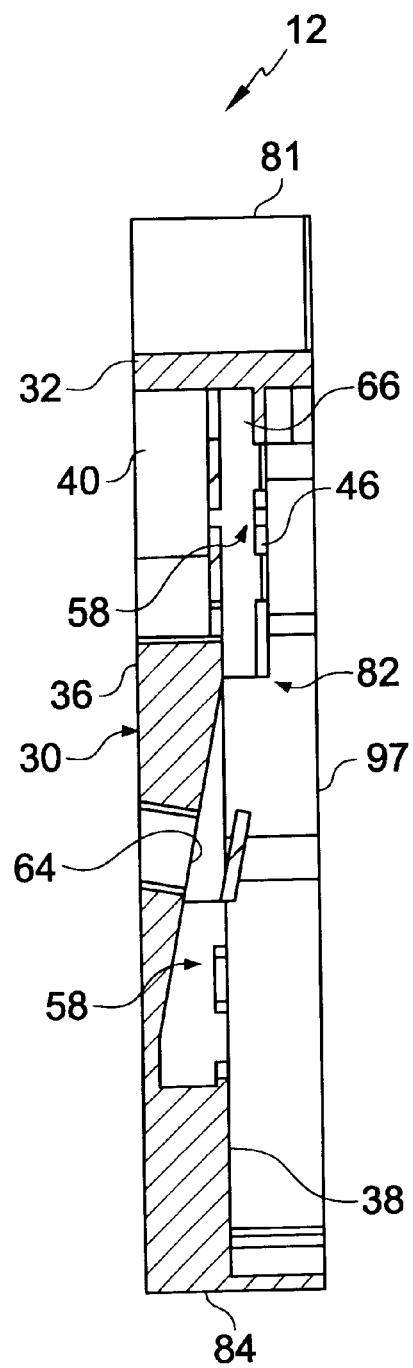
FIG. 7 is a vertical cross-sectional view of the base illustrated in FIG. 5 for the low profile communications outlet box illustrated in FIGS. 1–3 as seen along section line 7—7 of FIG. 5.

After fiber optic cables 22 wrap a sufficient number of times around winding ring 44, the fiber optic cables 22 exit substantially tangentially from the periphery of lower winding ring 44 via connecting section or passageway 62 of channel 58 which feeds the fiber optic cables 22 from lower winding ring 44 to upper winding ring 46. Connecting section 62 includes a ramp 64 such that the fiber optic cables 22 move from inner plane of lower winding ring 44 to an outer plane spaced therefrom for wrapping around upper winding ring 46. A plurality of the flanges 56 maintain the fiber optic cables 22 within connecting section 62 of channel 58. From connecting section 62 of channel 58, the fiber optic cables enter the curved section 66 of channel 58 which surrounds upper winding ring 46. The exit 68 of the curved section 66 is preferably arranged substantially vertically such that the fiber optic cables 22 are substantially vertical when exiting the curved passageway 66 of the guide channel. Preferably, entrance 60 is provided with a cable clip 70 for retaining the fiber optic cables 22 as they enter channel 58 as best seen in FIGS. 5, 8 and 10.

Outer wall structure 32 is preferably integrally formed with rear mounting member 30 and extends substantially perpendicular thereto. Of course, outer wall structure 32 can have tapered surfaces to accommodate molding of base 12. Preferably, outer wall structure 32 includes a top wall 81, a left wall 82, a right wall 83 and a bottom wall 84. Top wall 81 is preferably substantially perpendicular to left wall 82 and connected together by a curved corner portion. The right wall 83 has a saw-tooth configuration with a plurality of downwardly facing portions 86 and a plurality of upwardly facing portions 88. The downwardly facing portions 86 are provided with rectangular connector openings 90 which are designed to receive jacks 16 therein. Preferably, jacks 16 are connected within connector openings 90 via a snap-fit. Of course, jacks 16 can be secured within openings 90 using various other techniques. The downwardly facing portions 86 are preferably angled approximately 45° to the vertical axis of outlet box 10. This arrangement allows the communication wires to be plugged into jacks 16 to hang down therefrom with minimal strain thereon. In other words, if the openings for the jacks 16 were vertically arranged, the wires being plugged therein would bend approximately 90° due to gravity. This type of arrangement would cause unnecessary strain on the cables being plugged into jacks 16. Accordingly, by angling the jacks 16, the amount of strain in the wires being plugged into jacks 16 can be reduced.

Figure 8:
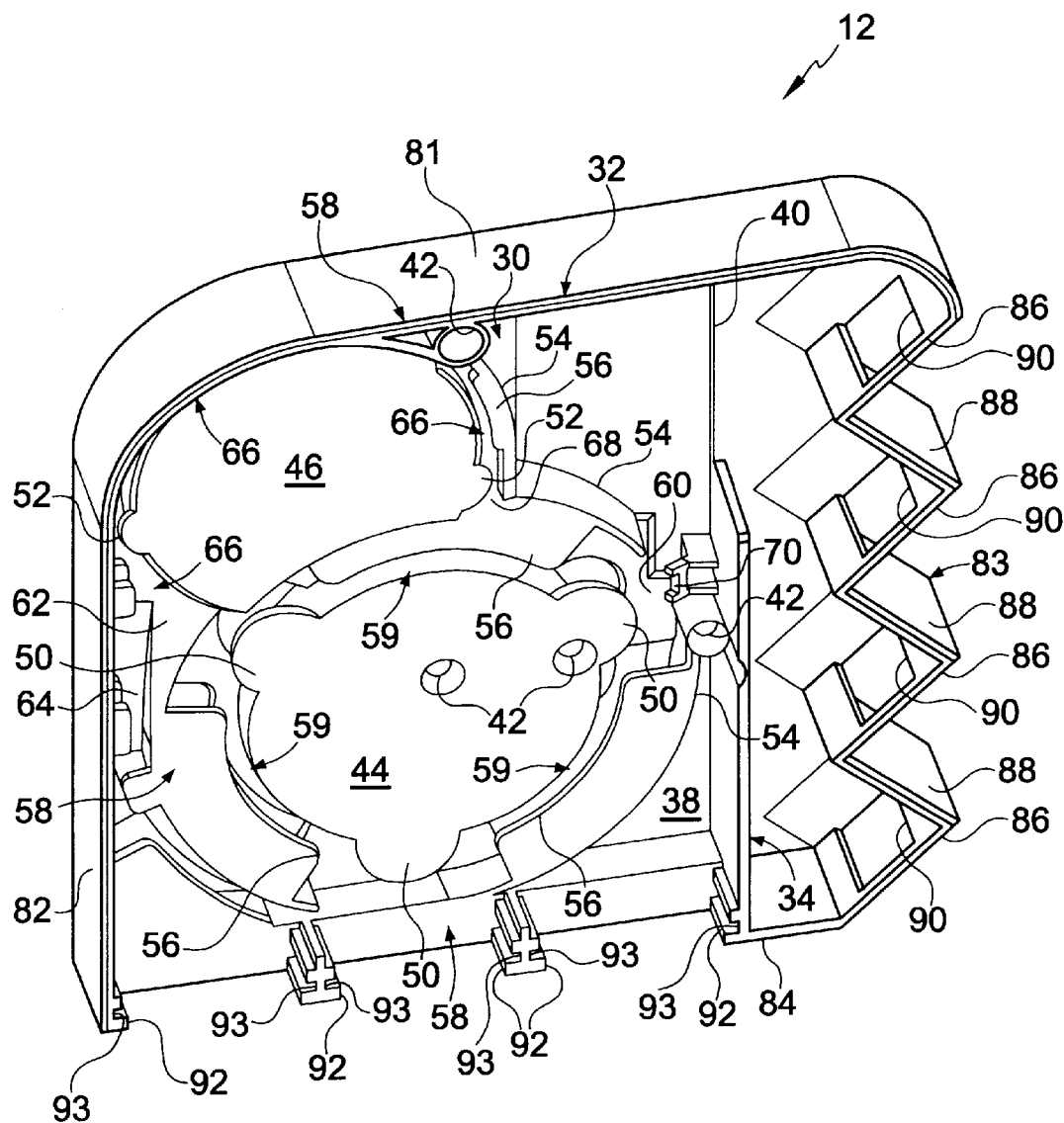
FIG. 8 is a front perspective view of the base illustrated in FIGS. 4–7 for the low profile communications outlet box of FIGS. 1–3 as seen from above.
Figure 9:
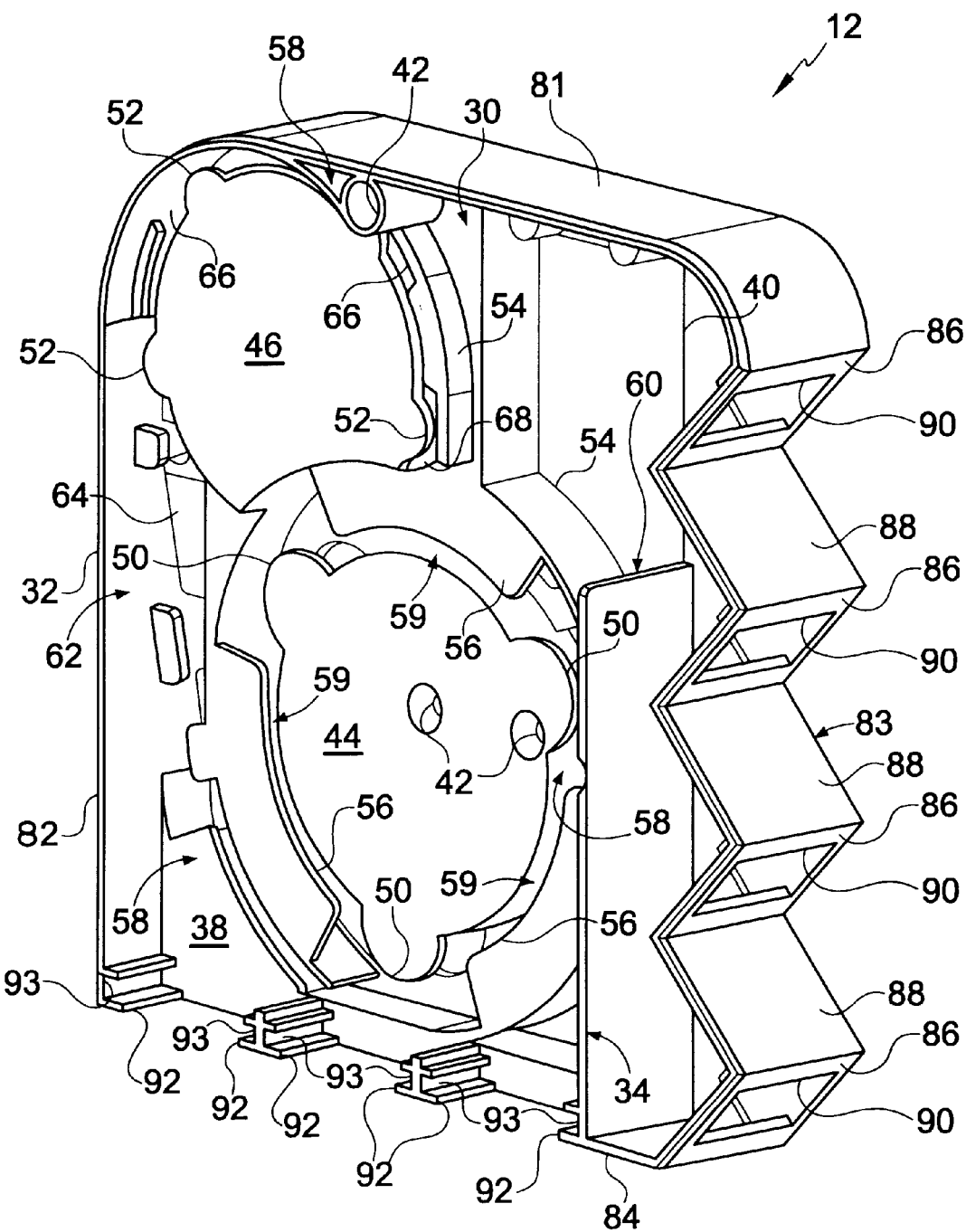
FIG. 9 is a front perspective view of the base illustrated in FIGS. 4–8 for the low profile communications outlet box illustrated in FIGS. 1–3 as seen from its right side.
Figure 10:
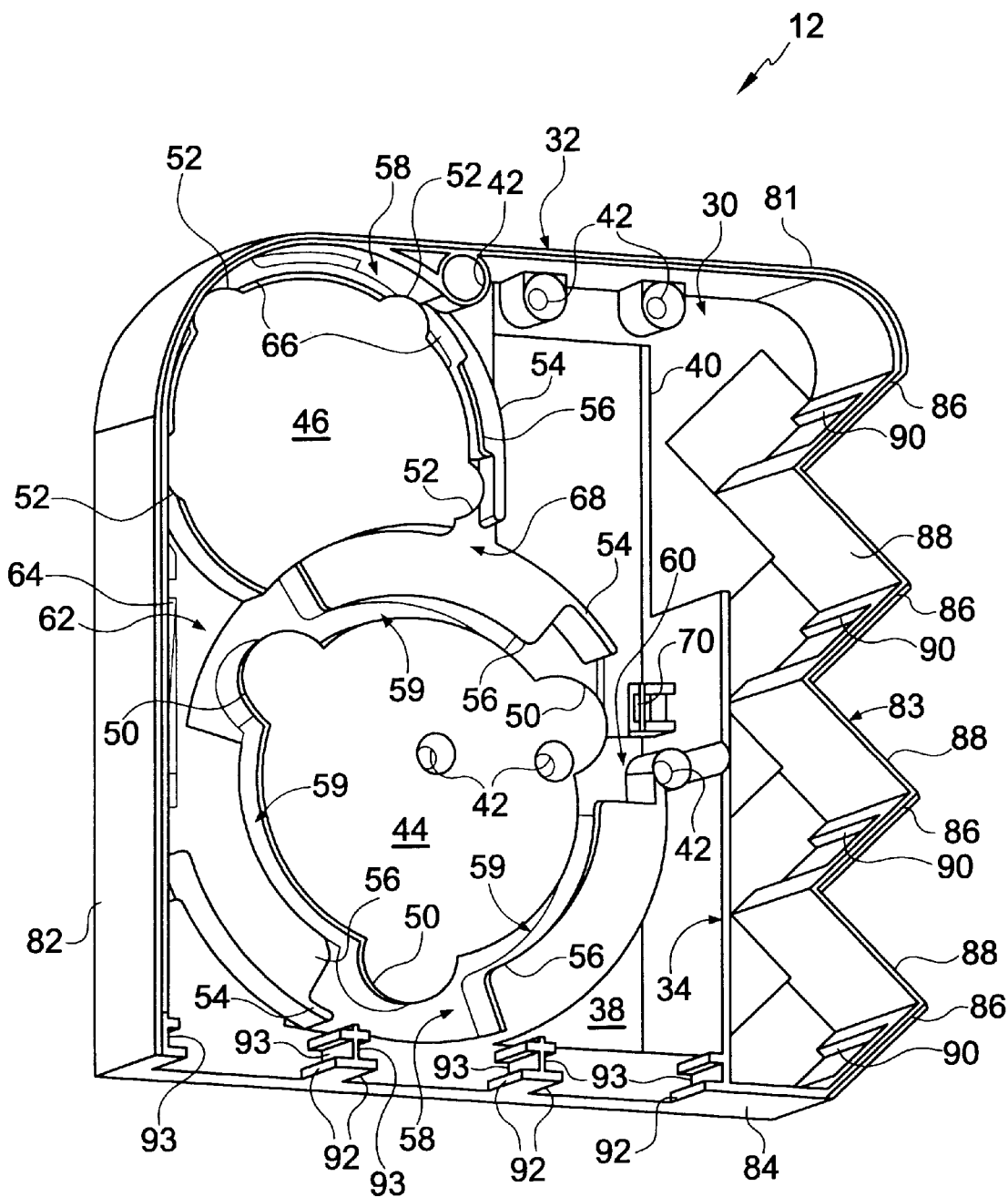
FIG. 10 is a front perspective view of the base illustrated in FIGS. 4–9 for the low profile communications outlet box illustrated in FIGS. 1–3 as seen from the left side.
Figure 11:
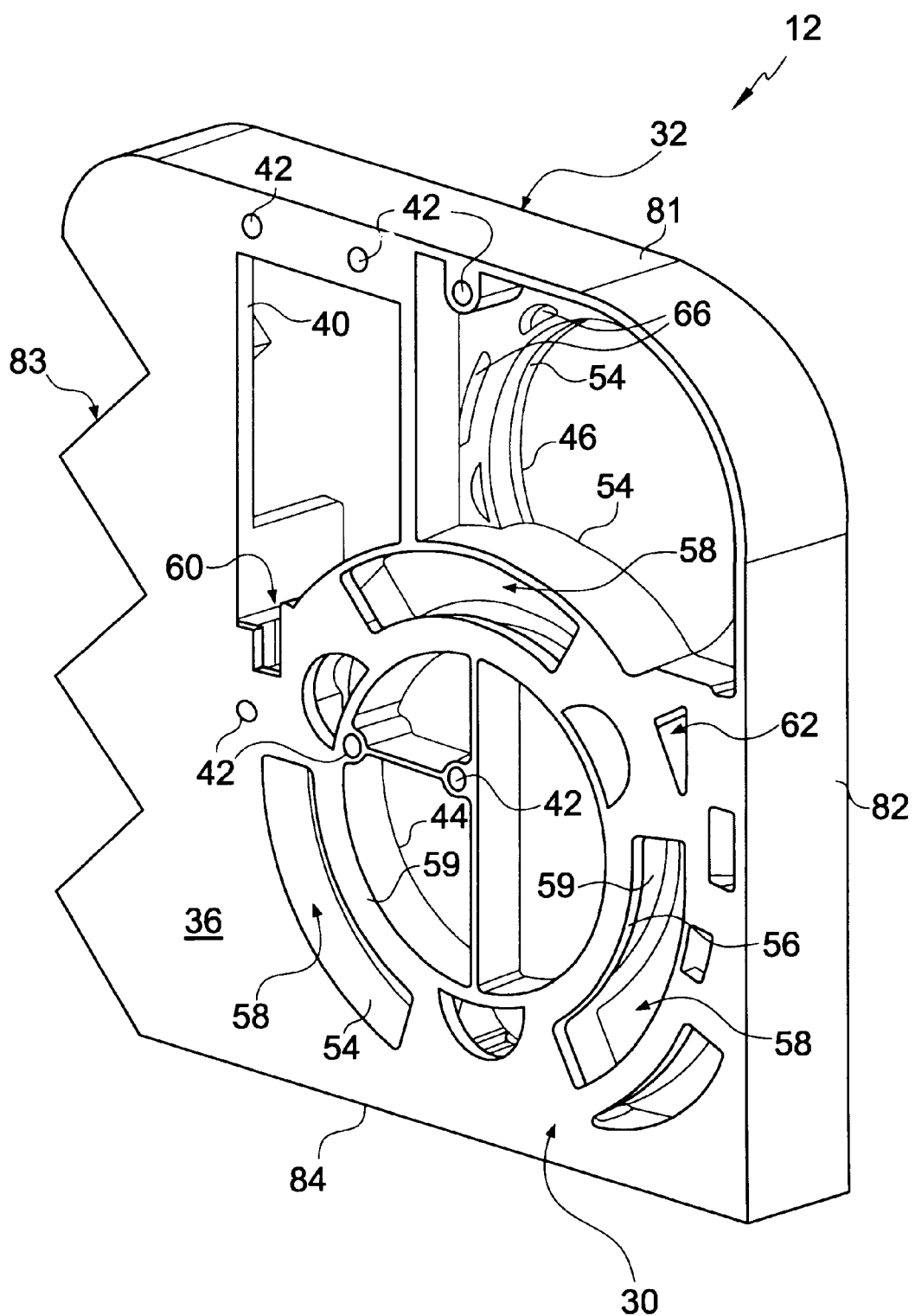
FIG. 11 is a rear perspective view of the base illustrated in FIGS. 4–10 for the low profile communications outlet box illustrated in FIGS. 1–3 as seen from its right rear side.
Figure 12:
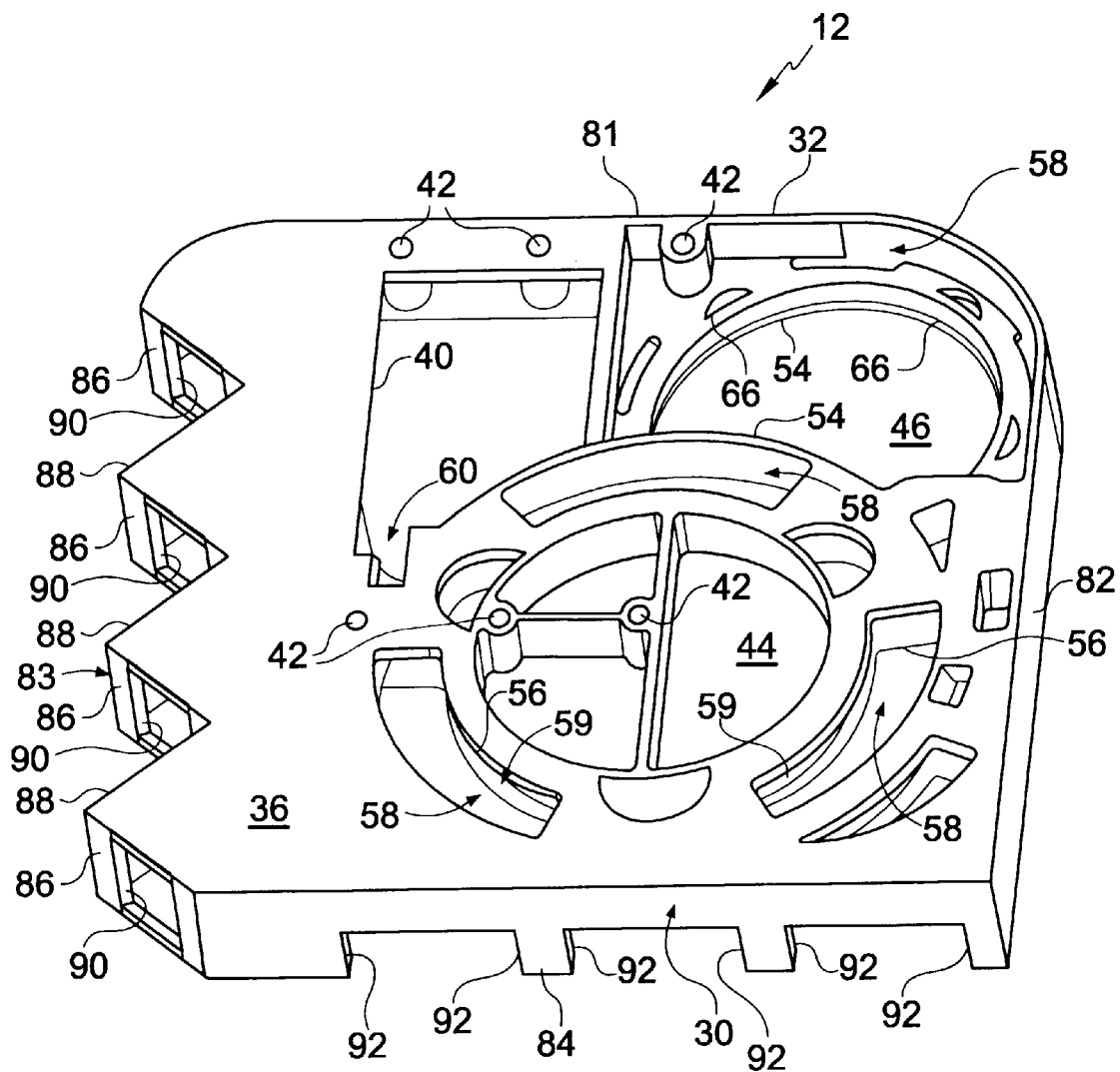
FIG. 12 is a rear perspective view of the base illustrated in FIGS. 4–11 for the low profile communications outlet box illustrated in FIGS. 1–3 as seen from the bottom.
Figure 13:
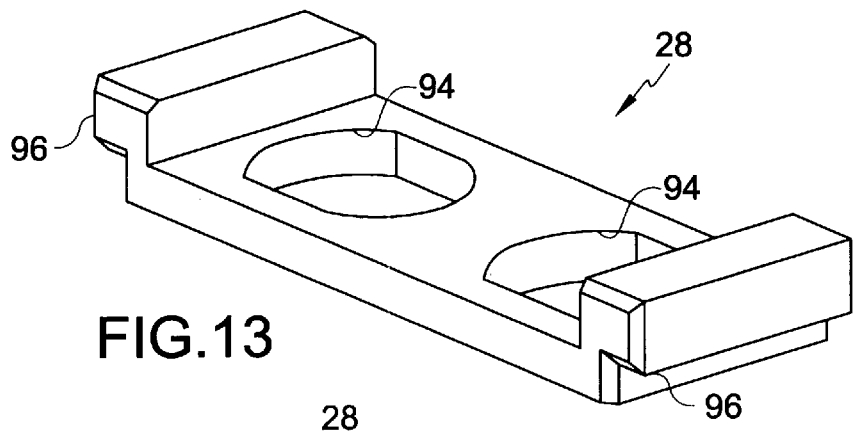
FIG. 13 is a perspective view of one of the retainers for securing ST style fiber optic cable connectors to the low profile communications outlet box illustrated in FIGS. 1–3.
Figure 14:
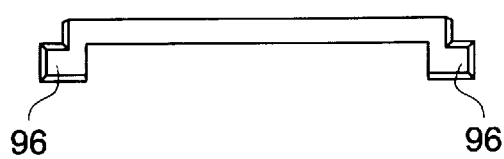
FIG. 14 is a top plan view of the retainer illustrated in FIG. 13 for coupling a pair of ST style fiber optic connectors to the low profile communications outlet box illustrated in FIGS. 1–3.
Figure 15:
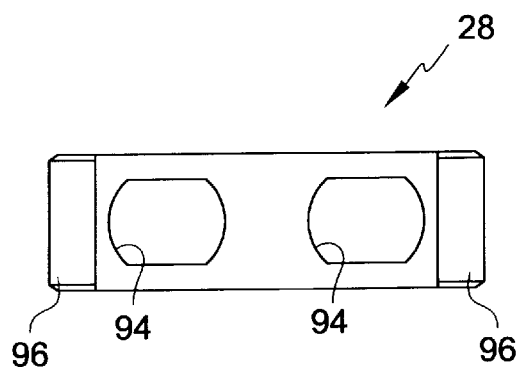
FIG. 15 is a front elevational view of the retainer illustrated in FIGS. 13 and 14 for coupling a pair of ST style fiber optic connectors to the low profile communications outlet box illustrated in FIGS. 1–3.
Figure 16:
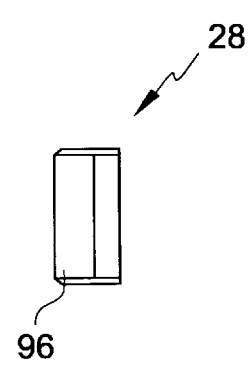
FIG. 16 is a right end elevational view of the retainer illustrated in FIG. 15 for coupling a pair of ST style fiber optic, connectors to the low profile communications outlet box illustrated in FIGS. 1–3.

Bottom wall 80 preferably has three openings 92 for accommodating fiber optic connectors 18 therein as best seen in FIGS. 8, 9 and 10. More specifically, six slots 93 are formed along bottom wall 84 adjacent openings 92 for receiving retainers 26, 27 and 28 therein. Of course, it will be apparent to those skilled in the art from this disclosure that connectors 18 can be coupled to bottom wall 84 in a variety of manners.

Since connectors 16 and 18 are arranged to exit out of the outer wall structure 32 (the side of outlet box 10), furniture can be moved directly against the box, i.e., within one inch of the wall. Moreover, using side exits for connectors 16 and 18 allows the face or front wall 97 of cover 14 to be solid, clean and able to protect all the contents, as well as to allow a much lower profile from the wall and still not damage any connections.

Turning now to FIGS. 13–16, retainer 28 for coupling a pair of fiber optic connectors 18 thereto is illustrated. Retainer 28 basically includes a pair of apertures 94 for receiving a pair of connectors therein and a pair of end flanges 96 to be slidably received within slots 93 of bottom wall 84. Preferably, retainer 28 is constructed of a fire resistant thermoplastic material. If desired, flanges 96 of retainer 28 can be frictionally retained within slots 93.

Figure 17:
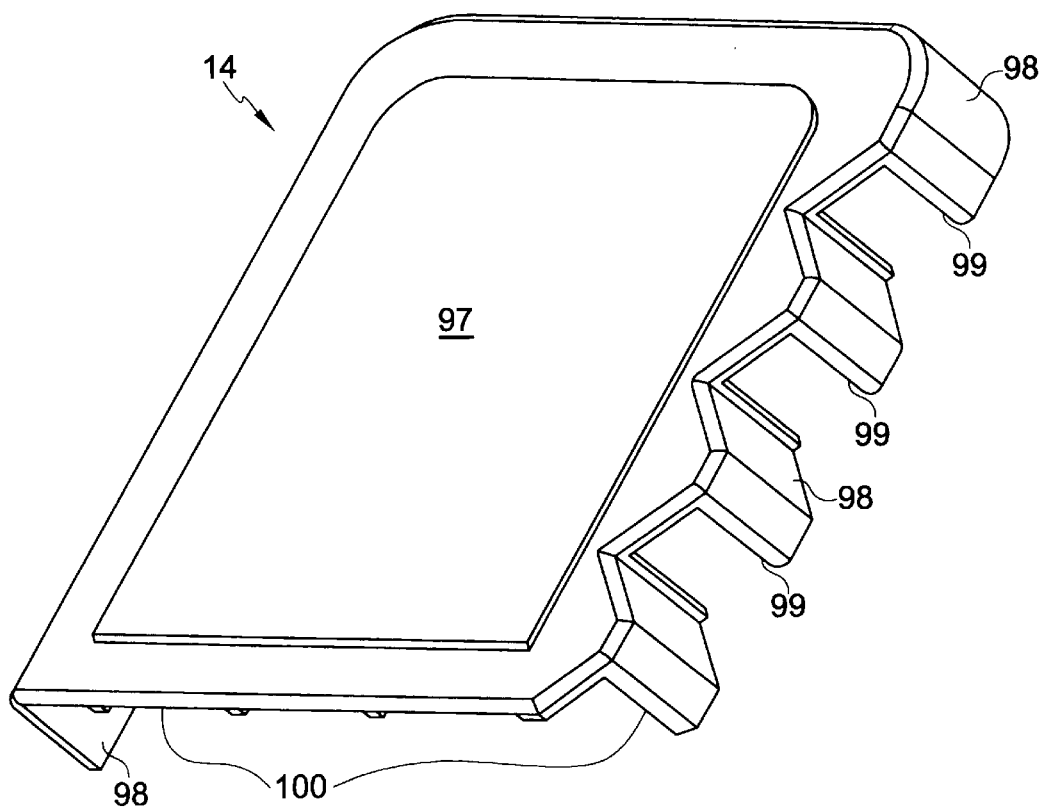
FIG. 17 is a front perspective view of the cover for the low profile communications outlet box illustrated in FIGS. 1–3 as seen from the bottom.
Figure 18:
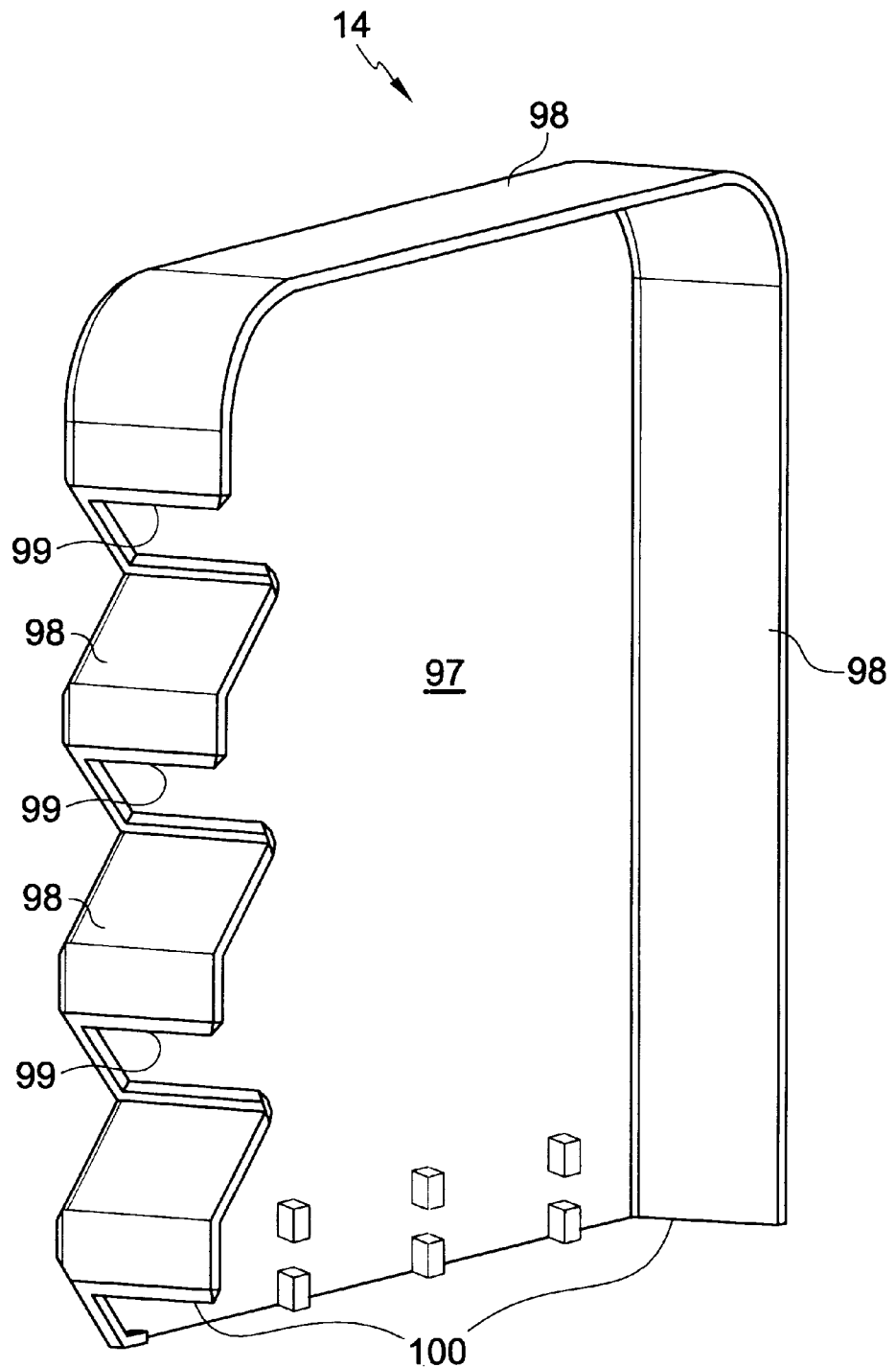
FIG. 18 is a rear perspective view of the cover illustrated in FIG. 17 for the low profile communications outlet box illustrated in FIGS. 1–3.

Referring now to FIG. 17, cover 14 is preferably a one-piece, unitary member which is integrally molded from a fire resistant thermoplastic material. Of course, other rigid materials known in the art could be utilized. Cover 14 has a front wall 97 with a peripheral sidewall 98 extending substantially perpendicular therefrom. Sidewall 98 substantially follows the contour of walls 81–83 of base 12. Moreover, sidewall 98 is provided with openings 99 for accommodating wires to be plugged into jacks 16 and a large lower opening 100 for accommodating wires or cables to be coupled to the fiber optic connectors 18. The rear surface of front wall 97 as seen in FIG. 18 is provided with blocks for engaging and retaining retainers 26, 27 and 28 within slots 93 of bottom wall 84 of base 12.

Second Embodiment

Referring now to FIGS. 20–23, a second embodiment of the present invention is illustrated. Communications outlet box 10' is similar in construction to communications outlet box 10 as discussed above, except that communications outlet box 10' has been modified to be more compact and more aesthetically pleasing. In particular, outlet box 10' has a reduced width from the first embodiment in that the lower ring has been moved so that the fiber optic strands exit the side of the lower winding ring 44' rather than the bottom as in the first embodiment. This eliminates additional space from the outlet box 10 of the first embodiment. More specifically, the additional connecting passageway 62 of the first embodiment has substantially been eliminated in this embodiment. Another difference between this embodiment and the first embodiment is that the saw-tooth edge of outlet box 10' has been modified so that it would appear to be straight when viewed in elevation.

In view of the similarities between the first embodiment and the second embodiment, communications outlet box 10' will not be discussed or illustrated in as much detail as the first embodiment. Moreover, the parts and/or components of outlet box 10', which are similar to that of the first embodiment, will be labeled with the same reference numeral as the first embodiment, except that a prime (') will be added to the reference numeral.

Moreover, some of the details of outlet box 10' have been eliminated the purposes of illustration. In other words, many of the features described and illustrated in the first embodiment can be utilized in this embodiment. For example, although tabs 50 and flanges 56 of outlet box 10 are not illustrated in this embodiment, it will be apparent to those skilled in the art from this disclosure that such tabs and flanges along guidewalls 54 can be utilized in this embodiment as needed and/or desired.

As seen in FIGS. 20–23, low profile communications outlet box 10' basically includes a base 12' adapted to be coupled to an electrical box (not shown) mounted within a wall, and a cover 14' adapted to be removably coupled to base 12'. Base 12' and cover 14' define an interior wiring space therebetween for receiving cables, preferably communication cables.

Figure 19:
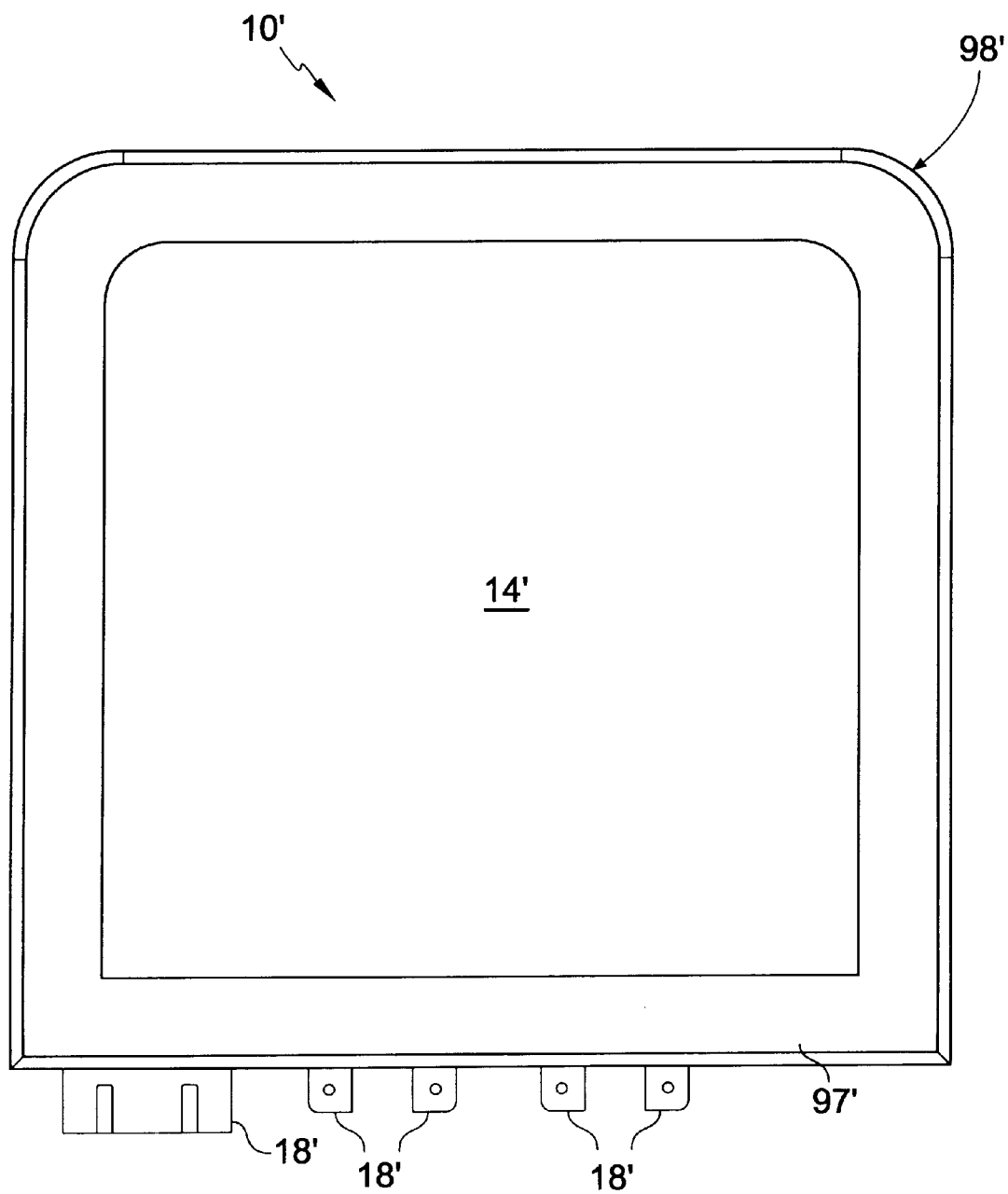
FIG. 19 is a front elevational view of a low profile communications outlet box for accommodating both fiber optic cables and copper cables in accordance with a second embodiment of the present invention.
Figure 20:
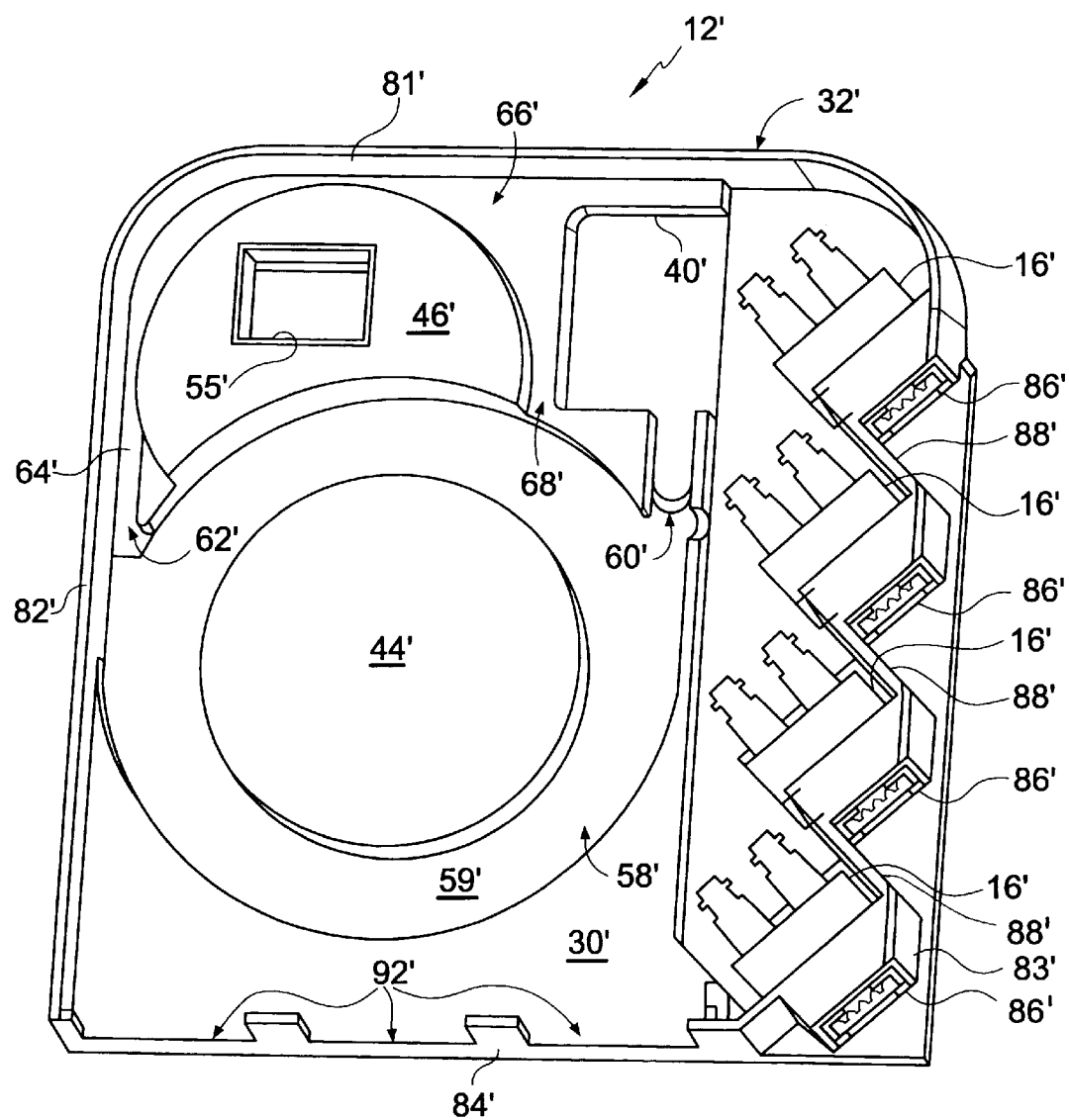
FIG. 20 is a diagrammatic perspective view of the interior of the base for the low profile communications outlet box illustrated in FIG. 19.

As seen in FIGS. 19 and 20, communications outlet box 10' is designed to accommodate four copper-based high density jacks or connectors 16' as well as three fiber optic connectors 18' which can be any combination of duplex style fiber optic connectors. Of course, it will be apparent to those skilled in the art from this disclosure that other types of connectors could be utilized with the communications outlet box in accordance with the present invention. Also, the communications outlet box 10' in accordance with the present invention can be modified to include a greater number or fewer jacks and/or connectors as needed and/or desired.

Figure 22:
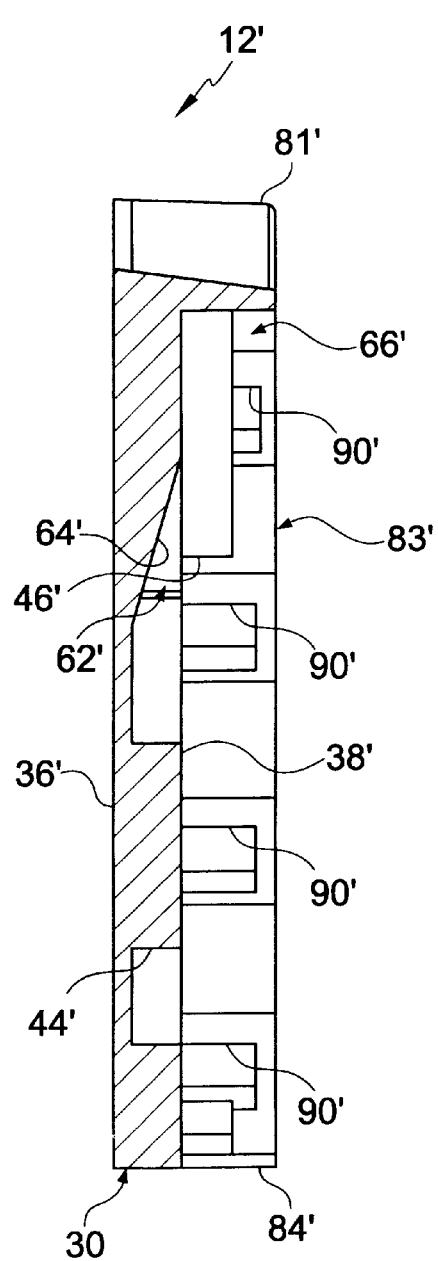
FIG. 22 is a vertical cross-sectional view of the base for the low profile communications outlet box illustrated in FIG. 19 as seen along section line 22—22 of FIG. 21.
Figure 23:
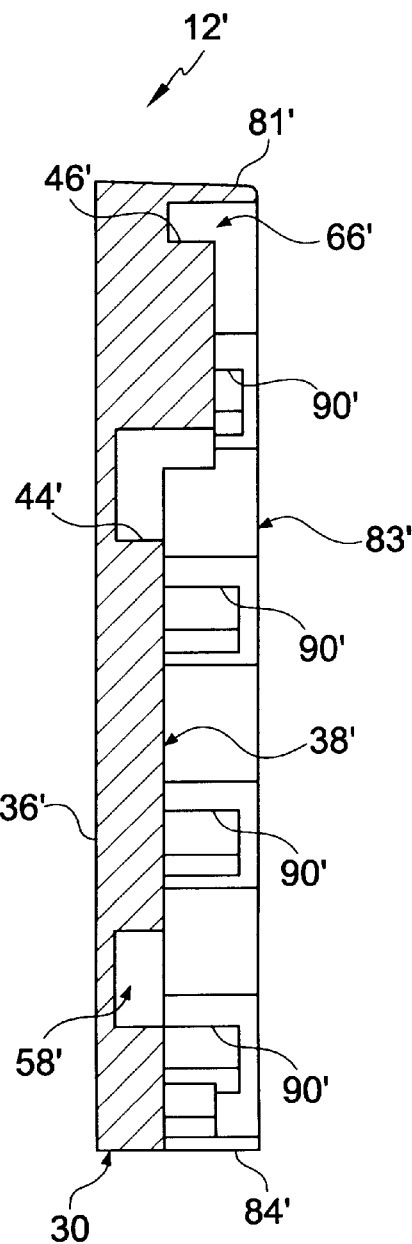
FIG. 23 is a vertical cross-sectional view of the base for the low profile communications outlet box illustrated in FIG. 19 as seen along section line 23—23 of FIG. 21.

Base 12' has a contoured rear mounting member 30' with an outer peripheral wall structure 32' extending substantially perpendicular therefrom to form an enclosure. As seen in FIGS. 22 and 23, rear mounting member 30' has a first or exterior side 36' for engaging a mounting surface such as a wall, a second or interior side 38' for directing and accommodating the copper cables and the fiber optic cables. A cable access opening 40' is formed in rear mounting member 30' such that the cables can enter communications outlet box 10 from the electrical box (not shown). Alternatively, the telecommunications cables can enter through the side of outlet box 10' instead of through the rear of outlet box 10' as mentioned above in the first embodiment.

Preferably, rear mounting member 30' has six mounting holes (not shown) formed therein for receiving fasteners or screws (not shown) to attach base 12' to the electrical box (not shown) in the same manner as mentioned above in the first embodiment. More specifically, these six mounting holes are arranged and spaced apart from each other such that two of the mounting holes can be utilized to mount base 12' to a single gang electrical box. The remaining four mounting holes are arranged to couple base 12' to a double gang electrical box in a conventional manner via fasteners. In either case, cable access opening 40' will be arranged such that it will align with the opening of the electrical box to which base 12' is to be mounted.

Of course, it will be apparent to those skilled in the art from this disclosure that base 12' can be mounted to other types of mounting surfaces utilizing other types of fasteners. For example, base 12' could be adhesively secured to a wall such that opening 40' overlies an opening in the wall such that the cables are received through cable access opening 40' into the interior of communications outlet box 10. Moreover, the mounting holes could be arranged such that base 12' can be attached directly to the wall utilizing conventional fasteners and anchors rather than to an electrical box.

To accommodate fiber optic cables, base 12' is provided with a pair of fiber optic cable winding rings or supports 44' and 46'. Preferably, winding rings or supports 44' and 46' are integrally formed with base 12' as a one-piece, unitary member. However, it will be apparent to those skilled in the art that winding rings 44' and 46' could be separate elements which are coupled to base 12'. Moreover, while in the preferred embodiments, winding rings 44' and 46' are formed as a part of base 12', it will be apparent to those skilled in the art that winding rings 44' and 46' could be coupled to cover 14' if needed and/or desired.

Winding rings or supports 44' and 46' are designed to protect fiber optic cables from excessive bending which can cause the fiber optic cables to be damaged. In particular, the minimum bend radius for fiber optic cables should be approximately 1.2 inches. Accordingly, the radii of winding rings 44' and 46' are at least 1.2 inches. Moreover, winding rings 44' and 46' are arranged relative to cable access opening 40' and connectors 18' such that the fiber optic cables are provided with a very natural path through the interior of communications outlet box 12' to feed fiber optic connectors 18'.

More specifically, cable access opening 40' is arranged such that the fiber optic cables enter through cable access opening 40' and then extend substantially tangentially to the outer peripheral surface of the lower winding ring 44'. The fiber optic cables can then wrap several times (for example, eight times) around lower winding ring 44' and then exit tangentially out of lower winding ring 44'. The fiber optic cables are then directed tangentially to the outer periphery of upper winding ring 46' where the fiber optic cables partially wrap therearound.

Upper wire ring 46' is spaced from the ends of fiber optic connectors 18' such that a very natural feed of the fiber optic cables occurs between upper winding ring 46' and connectors 18'. In other words, upper winding ring 46' is spaced from the inner ends of connectors 18' such that the fiber optic cables do not have to bend past their minimum bend radius. This can be accomplished by having upper winding ring 46' lying in a plane spaced from the plane of lower winding ring 44' such that the fiber optic cables exiting upper winding ring 46' pass over lower winding ring 44' to connectors 18'.

To maintain the fiber optic cables on winding rings 44' and 46', a plurality of tabs can be added to winding rings 44' and 46' in the same manner as discussed above in the first embodiment. In addition to tabs on the winding rings 44' and 46', rear mounting member 30' can also be provided with a plurality of flanges extending therefrom in the same manner as discussed above in the first embodiment. Winding ring 46' is provided with a rectangular slot 55' which is sized to receive one of the jacks 16' therein to assist in attaching cables or wires thereto.

Figure 21:
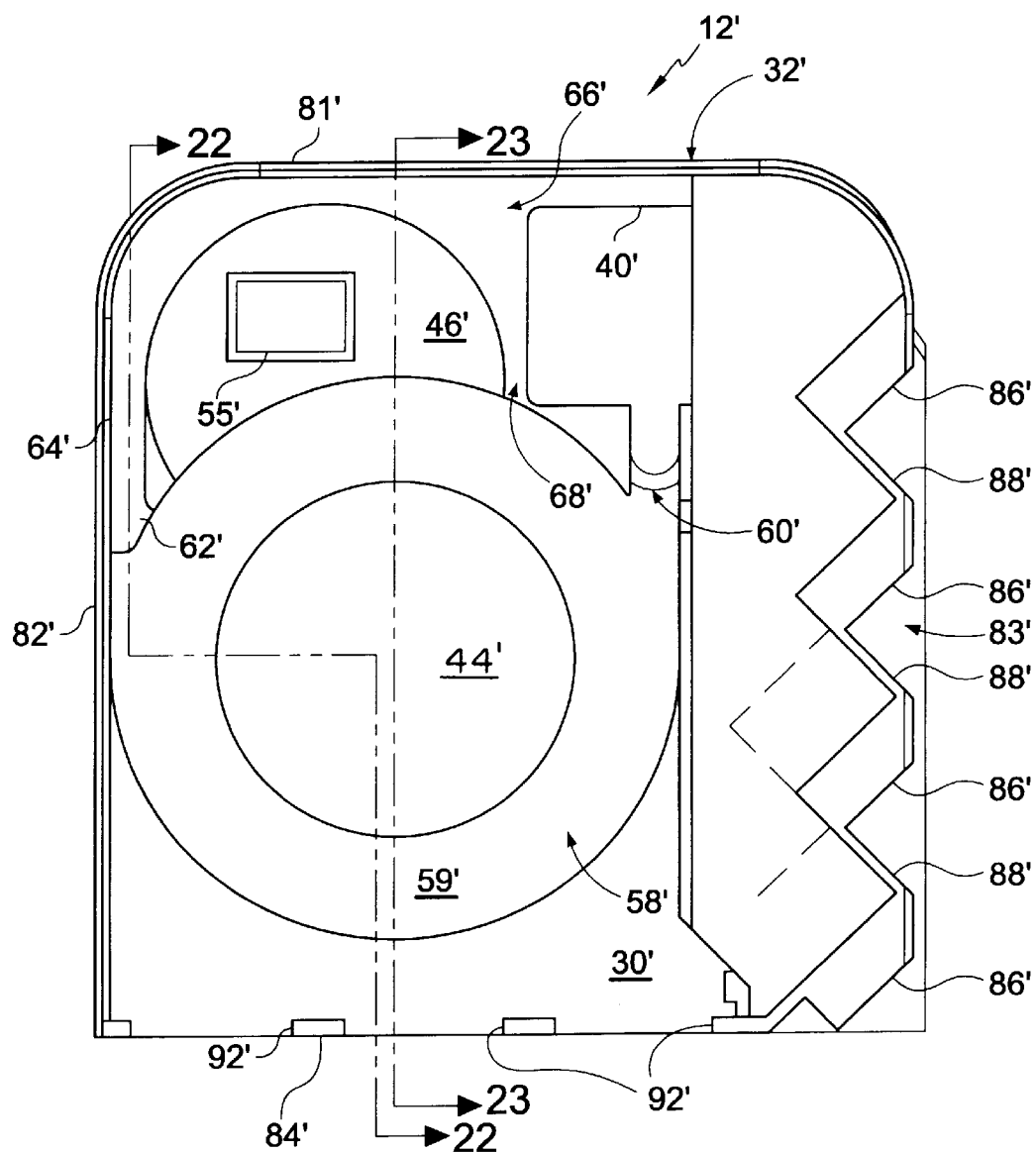
FIG. 21 is a front diagrammatic elevational view of the interior of the base for the low profile communications outlet box illustrated in FIGS. 19 and 20.

As best seen in FIGS. 20 and 21, guide channel 58' of this embodiment has a circular section 59' surrounding the exterior of lower winding ring 44', a connecting section 62' extending from circular section 59' to a curved section 66' which partially surrounds the exterior upper winding ring 44'. The channel 58' is also provided with an entrance 60' extending between cable access opening 40' and circular section 59' of channel 58'. The exit 68' of channel 58' is provided at the end of curved section 66' for feeding the fiber optic cables to connectors 18'.

More specifically, channel 58' formed by the contoured shape of rear mounting member 30' has a circular section 59' surrounding lower winding ring 44' with extending an entrance 60' between cable access opening 40' and circular section 59' of channel 58'. Accordingly, after the fiber optic cables enter communications outlet box 10' via cable access opening 40', the fiber optic cables enter circular section 59' of the channel 58' via entrance 60'. Once the fiber optic cables enter circular section 59' of channel 58', the fiber optic cables wrap around the periphery of lower winding ring 44'. The fiber optic cables are preferably retained on winding ring 44 via tabs (not shown) and flanges (not shown) as seen in the first embodiment.

After fiber optic cables wrap a sufficient number of times around winding ring 44', the fiber optic cables exit substantially tangentially from the periphery of lower winding ring 44' via connecting section or passageway 62' of channel 58' which feeds the fiber optic cables from lower winding ring 44' to upper winding ring 46'. Connecting section 62' includes a ramp 64' such that the fiber optic cables move from inner plane of lower winding ring 44' to an outer plane spaced therefrom for wrapping around upper winding ring 46'. A plurality of the flanges 56' maintain the fiber optic cables within connecting section 62' of channel 58'. From connecting section 62' of channel 58', the fiber optic cables enter the curved section 66' of channel 58' which surrounds upper winding ring 46'. The exit 68' of the curved section 66' is preferably arranged substantially vertically such that the fiber optic cables are substantially vertical when exiting the curved passageway 66' of the guide channel.

Outer wall structure 32' is preferably integrally formed with rear mounting member 30' and extends substantially perpendicular thereto. Preferably, outer wall structure 32' includes a top wall 81', a left wall 82', a right wall 83' and a bottom wall 84'. Top wall 81' is preferably substantially perpendicular to left wall 82' and connected together by a curved corner portion. The right wall 83' has a saw-tooth configuration with a plurality of downwardly facing portions 86' and a plurality of upwardly facing portions 88'. The downwardly facing portions 86' are provided with rectangular connector openings 90' which are designed to receive jacks 16' therein. Preferably, jacks 16' are connected within connector openings 90' via a snap-fit. Of course, jacks 16' can be secured within openings 90' using various other techniques.

The downwardly facing portions 86' are preferably angled approximately 45° to the vertical axis of outlet box 10'. This arrangement allows the communication wires to be plugged into jacks 16' to hang down therefrom with minimal strain thereon. In other words, if the openings for the jacks 16' were vertically arranged, the wires being plugged therein would bend approximately 90° due to gravity. This type of arrangement would cause unnecessary strain on the cables being plugged into jack 16'. Accordingly, by angling the jacks 16', the amount of strain in the wires being plugged into jack 16' can be reduced.

Bottom wall 80' preferably has three openings 92' for accommodating fiber optic connectors 18' therein as seen in FIG. 19.

As seen in FIG. 19, cover 14' is preferably a one-piece, unitary member which is integrally molded from a fire resistant thermoplastic material. Of course, other rigid materials known in the art could be utilized. Cover 14' has a front wall 97' with a peripheral sidewall 98' extending substantially perpendicular therefrom. Sidewall 98' substantially follows the outer periphery of mounting member 30' of base 12'. In this embodiment, front wall 97' has a substantially rectangular shape such that the saw-tooth shape of wall 83' of base 12' is hidden as seen in FIG. 19.

While only two embodiments have been chosen to illustrate the present invention, it will be understood by those skilled in the art from this disclosure that various changes and modifications can be made herein without departing from the scope of the present invention as defined in the appended claims.

What is claimed is:

1. A communications outlet box for a fiber optic cable comprising:
   a base having a mounting member with a first side for engaging a mounting surface, and a second side facing in a substantially opposite direction to said first side;
   a cover configured to be removably coupled to said base for forming a wiring space therebetween, with a first opening formed in said outlet box for receiving the fiber optic cable therethrough and into said wiring space between said base and said cover and a second opening formed in said outlet box for receiving a connector therein;
   a first winding member positioned relative to said first opening and between said base and said cover to receive the fiber optic cable about at least part of its curved periphery such that the fiber optic cable can extend from said opening to said first winding member without bending beyond its minimum bend radius; and
   a second winding member positioned relative to said first winding member and between said base and said cover to receive the fiber optic cable about at least part of its curved periphery such that the fiber optic cable can extend from said first winding member to said second winding member without bending beyond its minimum bend radius, said second winding member being at least partially positioned in a different plane from said first winding member such that the fiber optic cable exiting said second winding member can pass over said first winding member to be coupled to a fiber optic connector in said second opening without bending the fiber optic cable beyond its minimum bend radius.

2. A communications outlet box according to claim 1, wherein
   said outlet box includes a third opening for accommodating a high density jack.

3. A communications outlet box according to claim 2, wherein
   said outlet box includes an interior wall between said base and said cover which separates said winding members from said third opening.

4. A communications outlet box according to claim 3, wherein
   said outlet box includes a plurality of said third openings sized to accommodate high density jack connectors.

5. A communications outlet box according to claim 4, wherein
   said outlet box includes a plurality of said second openings sized to accommodate fiber optic connectors.

6. A communications outlet box according to claim 5, wherein
   said second and third openings are at least partially formed by an outer wall structure extending outwardly from said mounting member.

7. A communications outlet box according to claim 6, wherein
   said wall structure is integrally coupled to said mounting member.

8. A communications outlet box according to claim 7, wherein
   said first opening is formed in said mounting member.

9. A communications outlet box according to claim 8, wherein
   said first winding member is positioned between said first and second openings.

10. A communications outlet box according to claim 5, wherein
    said third openings lie in a plane which forms an angle of less than 90° with a plane formed by said second openings.

11. A communications outlet box according to claim 5, wherein
    one of said winding members has an aperture sized to receive a high density jack to hold it therein during termination of a cable thereto.

12. A communications outlet box according to claim 2, wherein
said curved peripheries of said winding members have radii of at least about 1.2 inches with centers of said winding members being spaced less than about 2.4 inches apart.

13. A communications outlet box according to claim 1, wherein
said outlet box includes an outer wall structure extending between said base and said cover with said second opening formed therein.

14. A communications outlet box according to claim 13, wherein
said outer wall structure includes a top wall portion, a pair of sidewall portions and a lower wall portion, with said second opening formed in said lower wall portion.

15. A communications outlet box according to claim 14, wherein
said lower wall portion is substantially rectangular.

16. A communications outlet box for a fiber optic cable comprising:
a base having a mounting member with a first side for engaging a mounting surface, and a second side facing in a substantially opposite direction to said first side;
a cover configured to be removably coupled to said base for forming a wiring space therebetween, with a first opening formed in said outlet box for receiving the fiber optic cable therethrough and into said wiring space between said base and said cover and a second opening formed in said outlet box for receiving a connector therein;
a first winding member positioned relative to said first opening and between said base and said cover to receive the fiber optic cable about at least part of its curved periphery such that the fiber optic cable can extend from said opening to said first winding member without bending beyond its minimum bend radius; and
a second winding member positioned relative to said first winding member and between said base and said cover to receive the fiber optic cable about at least part of its curved periphery such that the fiber optic cable can extend from said first winding member to said second winding member without bending beyond its minimum bend radius,
said curved peripheries of said winding members having radii of at least about 1.2 inches with centers of said winding members being spaced less than about 2.4 inches apart.

17. A communications outlet box according to claim 16, wherein
said second winding member at least partially lies in a different plane from said first winding member such that the fiber optic cable exiting said second winding member can pass over said first winding member to be coupled to a fiber optic connector in the second opening without bending the fiber optic cable beyond its minimum bend radius.

18. A communications outlet box according to claim 17, wherein
said outlet box includes a third opening for accommodating a high density jack.

19. A communications outlet box according to claim 18, wherein
said outlet box includes an interior wall between said base and said cover which separates said winding members from said third opening.

20. A communications outlet box according to claim 19, wherein
said outlet box includes a plurality of said third openings sized to accommodate high density jack connectors.

21. A communications outlet box according to claim 20, wherein
said outlet box includes a plurality of said second openings sized to accommodate fiber optic connectors.

22. A communications outlet box according to claim 21, wherein
said second and third openings are at least partially formed by an outer wall structure extending outwardly from said mounting member.

23. A communications outlet box according to claim 22, wherein
said third openings lie in a plane which forms an angle of less than 90° with a plane formed by said second openings.

24. A communications outlet box according to claim 20, wherein
one of said winding members has an aperture sized to receive a high density jack to hold it therein during termination of a cable thereto.

* * * * *